United States Patent [19]
Teng et al.

[11] Patent Number: 6,122,668
[45] Date of Patent: *Sep. 19, 2000

[54] SYNCHRONIZATION OF AUDIO AND VIDEO SIGNALS IN A LIVE MULTICAST IN A LAN

[75] Inventors: Peter Y. Teng, Palo Alto; Bruce Albert Thompson, San Jose; Fouad A. Tobagi, Los Altos, all of Calif.

[73] Assignee: Starlight Networks, Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/552,350

[22] Filed: Nov. 2, 1995

[51] Int. Cl.[7] .............................. G06F 13/38; G06F 15/17
[52] U.S. Cl. .............................. 709/231; 709/29; 345/328
[58] Field of Search .............................. 395/200.78, 806, 395/807, 200.47, 200.49, 200.61; 348/7–715; 345/328, 302, 327; 370/476, 473; 709/248, 219, 231

[56] References Cited

U.S. PATENT DOCUMENTS

| | | | |
|---|---|---|---|
| 5,333,299 | 7/1994 | Koval et al. ............................ | 395/550 |
| 5,506,932 | 4/1996 | Holmes et al. ......................... | 395/2.14 |
| 5,537,409 | 7/1996 | Moriyama ................................. | 370/84 |
| 5,541,662 | 7/1996 | Adams et al. .......................... | 348/460 |
| 5,557,724 | 9/1996 | Sampat et al. .......................... | 395/157 |
| 5,559,999 | 9/1996 | Maturi et al. .......................... | 395/550 |
| 5,594,660 | 1/1997 | Sung et al. .............................. | 364/514 |
| 5,598,352 | 1/1997 | Rosenau et al. ........................ | 364/514 |
| 5,619,197 | 4/1997 | Makamura ................................. | 341/50 |
| 5,642,171 | 6/1997 | Baumgartner et al. ................. | 348/515 |
| 5,652,749 | 7/1997 | Davenport et al. ..................... | 370/466 |
| 5,655,144 | 8/1997 | Milne et al. ............................ | 395/807 |
| 5,664,226 | 9/1997 | Czako et al. ....................... | 395/182.03 |

OTHER PUBLICATIONS

Katseff, "On the synchronization and display of multiple full–motion video streams", Dec. 1991

*Primary Examiner*—Mark H. Rinehart
*Attorney, Agent, or Firm*—Proskauer Rose LLP

[57] ABSTRACT

In a live multicast in a LAN environment, audio and video streams are transmitted from a source station to a plurality of receiving stations. A technique is disclosed for synchronizing the audio decoder clock at each receiving station with the source station. A technique is also disclosed for synchronizing the audio and video data streams received at each receiving station.

4 Claims, 4 Drawing Sheets

SYNCHRONIZATION OF AUDIO AND VIDEO SIGNALS IN A LIVE MULTICAST IN A LAN

FIELD OF THE INVENTION

The present invention relates to the delivery of a live audio or audio/video multicast in a Local Area Network (LAN). Specifically, the present invention relates to audio synchronization between the multicast source station in the LAN and each multicast receiving station in the LAN. The present invention also relates to synchronization of the multicast audio and video signals received at each multicast receiving station in the LAN.

BACKGROUND OF THE INVENTION

A LAN 5 is illustrated in FIG. 1. The LAN 5 includes the segment 10. The LAN segment 10 comprises a shared transmission medium 12. A plurality of stations 14-1, 14-2, 14-3, 14-4, 14-5, ..., 14-N are connected to the transmission medium 12. Illustratively, the LAN segment 10 is an Ethernet segment. A hub 20 (repeater) may also be connected to the transmission medium 12. The hub 20 connects the LAN segment 10 to other LAN segments 22, 24 and their associated stations 23, 25. The LAN segment 10 is connected to a Wide Area Network via the gateway 30. Note that one of the stations 14-1 serves as a source of a live audio/video multicast. A subset of the stations 14-2, 14-3, 14-2, ..., 14-N receive the multicast.

Illustratively, a multicast is a communication in which data is broadcast from a source station to a plurality of receiving stations. However, each of the receiving stations individually decides if it wants to participate in the multicast.

It should be noted that, while in FIG. 1, the source of the live multicast is shown as being part of the network segment 10, this is not necessarily the case. The source of the live multicast may be a station in another segment 22, 24 and the multicast may be transmitted into the segment 10 via the hub 20. The source of the live multicast may also be entirely outside the LAN 5 and may be transmitted into the segment 10 via the gateway 30.

The source station 14-1 is shown in greater detail in FIG. 2. The source station 14-1 comprises a bus 40. Connected to the bus 40 are a CPU 42 and a main memory 44. Also connected to the bus 40 is a live audio/video interface 45 and a live audio/video source 46. The live audio/video source 46 may be a video camera for generating audio and video signals. The audio/video source 45 may also be an antenna for receiving a terrestrial audio/video broadcast signal or a satellite receiver for receiving an audio/video signal from a satellite. The audio/video interface 45 digitizes and compresses the received audio and video signals. The audio data is compressed using a conventional voice compression algorithm such as Pulse Code Modulation (PCM), to generate an audio data bit stream with a bit rate of 16–64 k bits/sec. The video data is compressed using a conventional digital compression algorithm such as motion JPEG or Indio. Thus, the audio is encoded at a constant rate while the number of bits used to encode each frame of video varies. The compressed audio and video data is transmitted via the bus 40 from the interface 45 to the memory 44 for temporary storage. Under the control of software executed by the CPU 42, the compressed audio and video data is organized into messages. Illustratively, each video message contains data for one frame of video, each audio message contains audio data associated with a fixed number of video frames. The CPU 42 then fragments the messages into packets of an appropriate size for transmission via the network 5.

A LAN interface 50 is connected to the bus 40. The LAN interface 50, which includes physical processing and the so-called Media Access Controller or MAC, interfaces the source station 14-1 to the transmission medium 12 (see FIG. 1). The LAN interface 50 receives from the memory 44 packets containing audio data and packets containing video data belonging to the live multicast. The LAN interface 50 performs physical layer processing on each packet and transmits the packets via the transmission medium according to the media access protocol. The audio and video packets are transmitted separately and independently. The source station 14-1 also comprises a display interface 60 for interfacing the bus 40 to a display system 62. The display interface 60 is described in greater detail below. The display system 62 includes a speaker for reconverting the audio signal portion of the multicast back into sound and a visual display for displaying the video portion of the multicast. The messages containing audio and video data may be transmitted from the memory 44 to the display interface 60 for display using the system 62.

One of the multicast receiving stations 14-N is shown in greater detail in FIG. 3. The station 14-N comprises a bus 80. Connected to the bus 80 are a CPU 82 and a main memory 84. The station 14-N also includes a LAN interface 86 connected to the bus 80. A display interface 60 is connected to the bus 80 and the display 62. If the station 14-N is a member of the live multicast, the packets transmitted from the source station 14-1 are received from the transmission medium at the LAN interface 86. The packets undergo physical processing in the LAN interface 86 and are transferred to the main memory 84 for temporary storage. The packets are then combined into the audio and video messages. These messages are transmitted to the display interface 60. In the display interface 60, the audio and video data are decompressed using a video decoder and audio decoder and transmitted to the display system 62 for display of the video and playing of the audio.

Techniques for establishing a multicast in a LAN environment and techniques for enabling a particular receiving station to join a multicast in a LAN are disclosed in "MULTICAST ROUTING TECHNIQUE", Ser. No. 08/417,067, filed Apr. 4, 1995 by Joseph M. Gang, Jr. This application is assigned to the assigned to the assignee hereof and is incorporated herein by reference.

It should be noted that the multicast source station operates in the "push mode". This means that there is no feedback from the receiver stations to the source station for flow control as there might be in the case in a point-to-point communication involving a single source and a single destination.

Due to the fact that the source station's audio encoder and the receiving station's audio decoder are not using the same clock, the audio data "pushed out" by the source station can be faster or slower than the receiving station can play.

Accordingly, it is an object of the invention to provide a method to maintain the receiver audio decoder and source audio encoder in synchronism.

In a live audio/video multicast in a LAN environment, wherein the source is operating in the "push mode", there is no guarantee of data delivery. In addition, the audio and video packets are received separately and independently at each receiver station. In this environment, it is important to synchronize the audio and video data received at each receiving station. This is important for achieving "lip sync", i.e., a synchronization between the movement of a person's lips seen on the video display and the words played by the speaker.

Accordingly, it is a further object of the invention to provide a method to synchronize live multicast audio and video data received at a participating receiving station in a LAN.

SUMMARY OF THE INVENTION

In accordance with a preferred embodiment of the present invention, a source station transmits live audio and video data on a LAN. As indicated above, the source station transmits its data in a "push mode" as opposed to a flow-controlled fashion. Due to the fact that the source station and each receiving station are not using the same clock to generate and consume (play back) the audio data, the audio data stream transmitted by the source station may be slower or faster than each receiving station can consume.

To solve this problem at each receiving station participating in the multicast, the occupancy of an audio receiving queue which receives the multicast audio data is monitored.

The audio receiving queue at a receiving station is a FIFO queue which comprises a series of buffer units. At the start of the receiving station's participation in the multicast, its audio receiving queue is filled to an initial predetermined occupancy level. If the audio data consumption rate of the receiving station is too slow relative to the received audio data stream, the occupancy of the audio receiving queue will exceed an upper threshold level. If the audio consumption rate of the receiving station is too fast relative to the received audio data stream, the occupancy level of the audio receiving queue will fall below a lower threshold level. By detecting these two conditions, each receiving station participating in the multicast gains knowledge about whether the source station has a clock for the audio data stream which is faster or slower than the audio data stream clock at the receiving station. Once one of the foregoing conditions is detected, several steps may be taken:

(1) the clock at the receiving station may be tuned, i.e., sped up or slowed down; or (2) the audio receiving queue at the receiving station may be reset to the initial occupancy. This means data is removed from or added to the queue; or (3) the audio receiving queue may be trimmed. The difference between a queue trim and a queue reset is as follows. In a reset, data is removed from or added to the queue by filling or emptying one or more buffer units. In a trim, one or more bytes of data are added or removed from several buffer units.

To determine whether the occupancy of the audio receiving queue is above an upper threshold or below a lower threshold a time average of the audio receiving queue occupancy is preferably used. To determine this time average, the queue occupancy is periodically measured, and each measured occupancy is stored in a history buffer. A low pass digital filtering algorithm can be used on the queue occupancy history buffer to detect if the queue is slowly increasing or decreasing in occupancy. The low pass filtering can be implemented by using a moving average algorithm on the audio receiving queue occupancy history. If the output signal of the low pass filtering of the audio receiving queue occupancy history goes above or below predetermined thresholds, then one of the steps (1), (2), or (3) may be taken.

In addition, according to the invention, it is desirable to synchronize the audio and video data received by a receiving station participating in a live multicast.

Generally, the audio and video data of a live multicast are transmitted by the source station in separate streams. Separate packets are used for the transmitting of video and audio data. This enables the loss of video and audio data to be dealt with separately.

To achieve synchronization between audio and video data in a live multicast, the following steps are performed:

A) At the source station:
1) Transmit the audio data in fixed sized messages. (Illustratively, each audio message contains audio data associated with a fixed number of video frames.)
2) Transmit the video data in messages of variable size, each message containing the data of one video frame,
3) Mark time stamps in the audio stream messages and video stream messages. For example, each audio message receives the time stamp of the first video frame with which it is associated. The purpose is to provide each receiving station with knowledge as to which video data frames to associate with each audio data message.

B) At each receiving station:
1) The audio messages are received in an audio receiving queue and the video messages received in a video receiving queue;
2) Each received fixed size audio message is divided into individual chunks which have a playtime equal to a video frame display time. The video frame display time is determined by the frame display rate which is 30 frames per second for example. The audio data chunks are transferred from the audio receiving queue to the audio decoder to be decoded and played.
3) The receiving station determines an audio chunk time stamp of a next audio chunk to be played. The desired audio chunk time stamp is determined from the occupancy of the audio queue, i.e., how many chunks are in the audio queue, and the time stamp in the last audio message received in the audio buffer;
4) If the audio chunk time stamp is larger than the time stamp of the actual next video frame in the video queue, this video frame should be discarded. If the audio chunk time stamp is smaller than the time stamp of the actual next video frame in the video queue, then the next actual video frame should be delayed until the proper time has been reached to display the frame.

In the foregoing manner, the receiving station audio clock is synchronized to the received audio stream and the received audio and video streams are synchronized to each other.

DETAILED DESCRIPTION OF THE INVENTION

Figure 1:
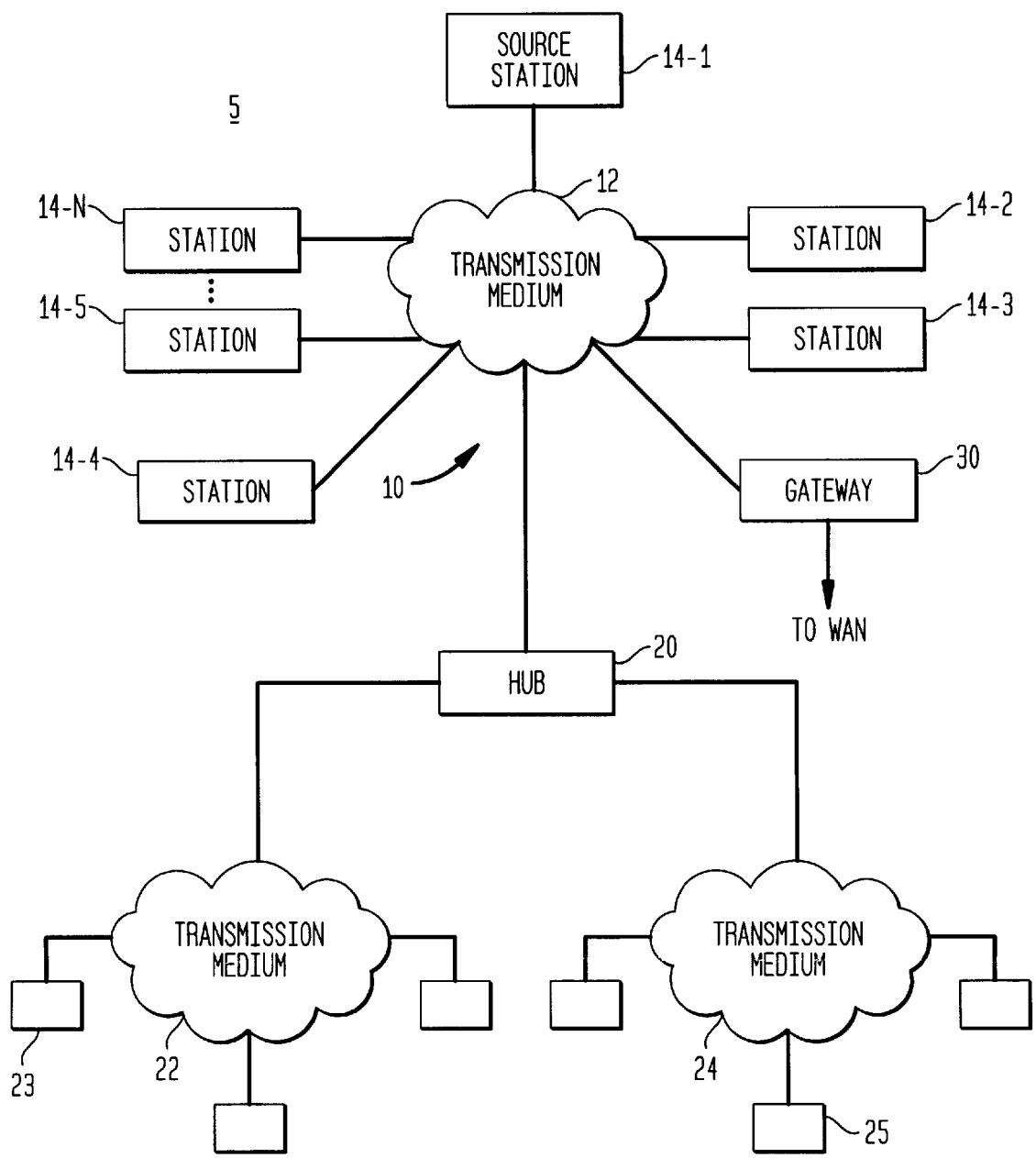
FIG. 1 schematically illustrates a LAN.
Figure 2:
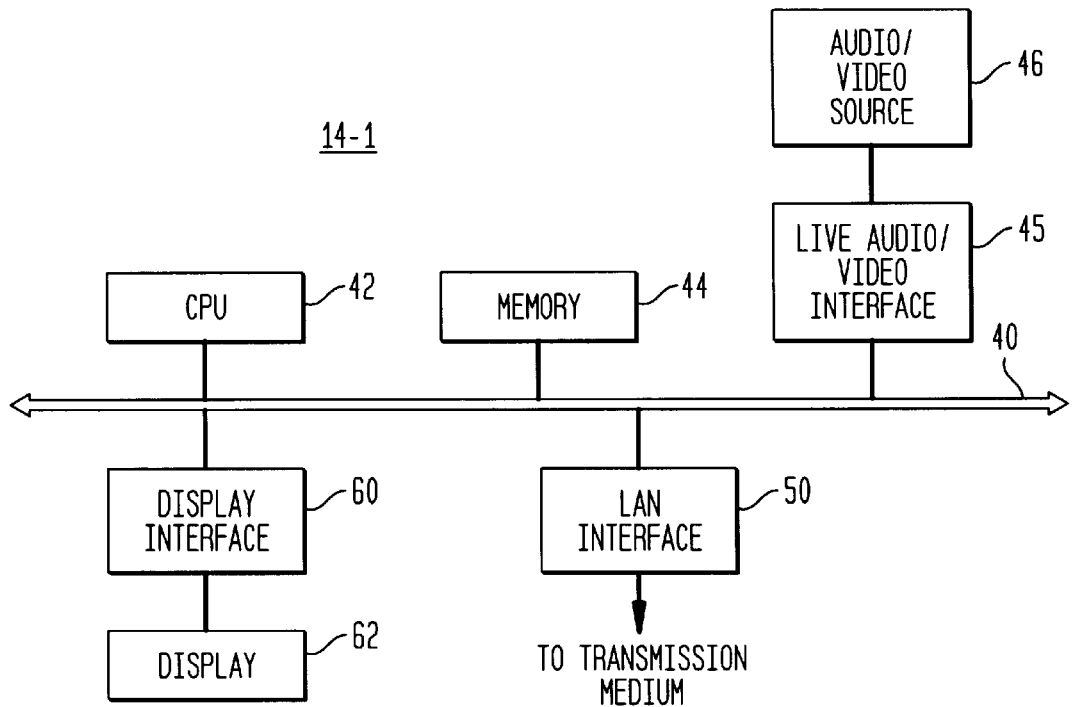
FIG. 2 illustrates a source station for a live audio/video multicast in the LAN of FIG. 1.
Figure 3:
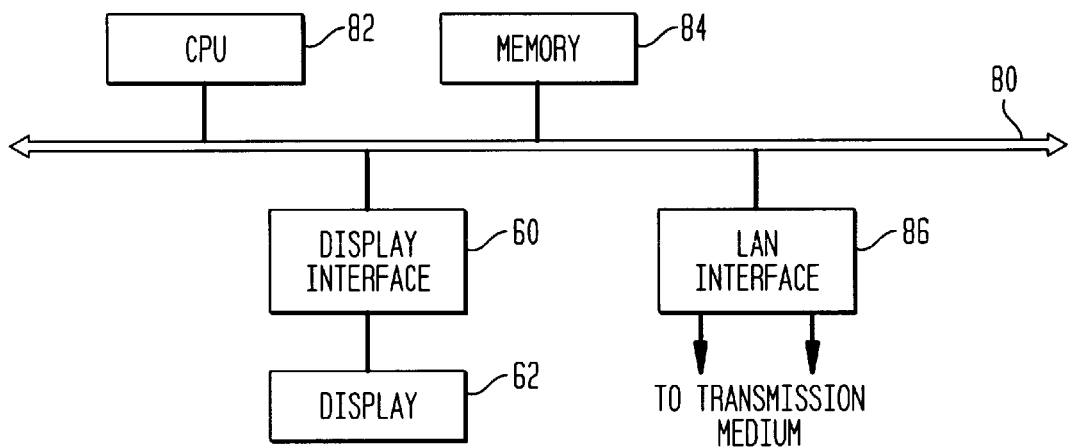
FIG. 3 illustrates a receiving station for a live audio/video multicast in the LAN of FIG. 1.
Figure 4:
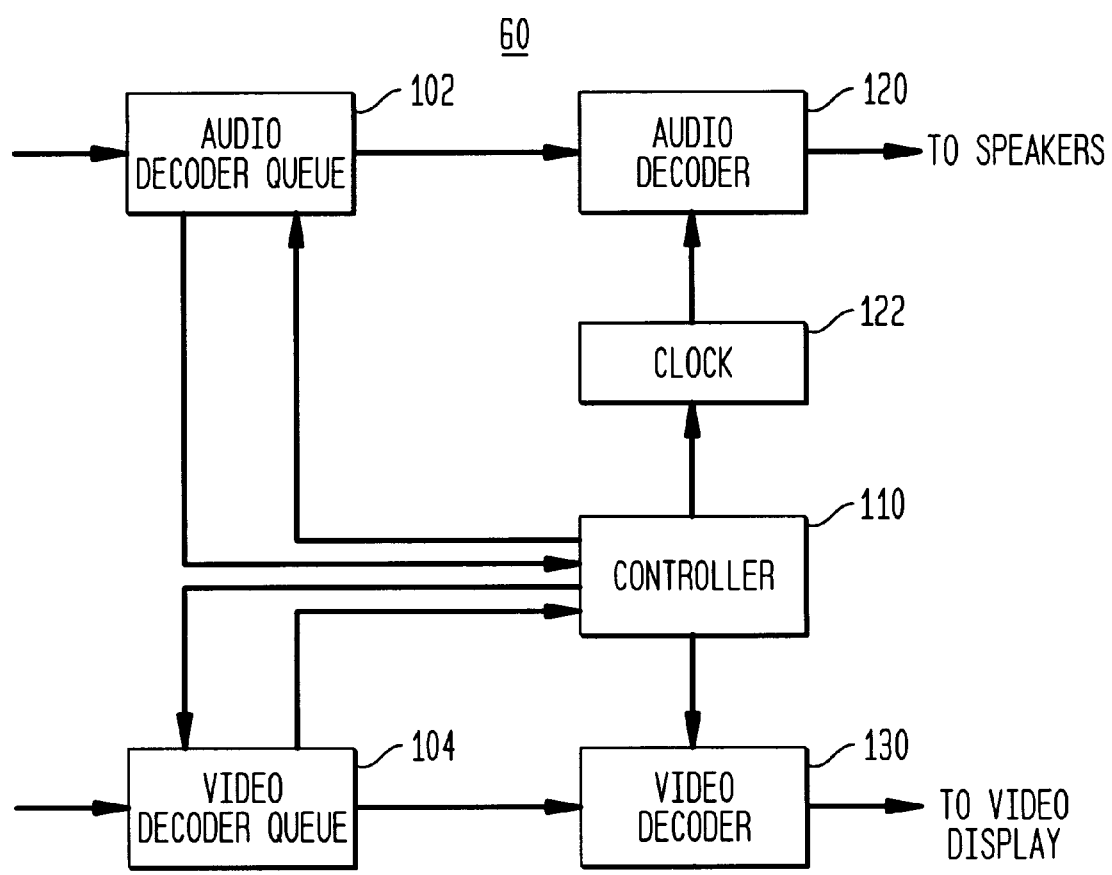
FIG. 4 illustrates a display interface for use in a receiving station such as that illustrated in FIG. 3.

FIG. 4 schematically illustrates a display interface 60 which is part of the receiving station 14-N shown in FIG. 3.

The display interface 60 includes a queue 102 for receiving audio messages from the source station and a queue 104 for receiving video messages from the source station. The queues 102 and 104 are FIFO queues.

As indicated above, in connection with the discussion of FIG. 3, packets containing audio data and packets containing video data are received at the LAN interface 84 from the network transmission medium. The packets are transferred via the bus 80 to main memory 86. Under the control of the CPU 84, the packets are reassembled into audio messages and video messages and then transferred via the bus 80 to the queues 102 and 104 in the interface 60.

The display interface 60 of FIG. 4 includes a controller 110. The controller 110 may be a dedicated hardware controller or a general purpose CPU which executes a stored program to control the various elements in the interface 60. Alternatively, the controller 110 may be omitted and the elements of the interface 160 may be controlled by the CPU 82 (see FIG. 3).

The display interface 60 also include an audio decoder 120 for decoding (i.e., decompressing) the audio data stored in the queue 102. The audio decoder 120 receives a clock signal from the clock 122. The audio decoder 120 is connected to an A/D converter (not shown) which converts the decoded audio data from digital to analog form and a speaker which plays the analog audio. The interface 60 also includes a video decoder 130 for decoding (i.e., decompressing) video data stored in the video buffer 104.

The video decoder 130 is connected to a video display (not shown) which displays the sequence of frames of the decoded video.

To synchronize the clock 122 with the audio clock at the source station, the controller 110 monitors the occupancy level of the audio queue 102. The controller then takes steps to ensure that the audio queue 102 does not overflow or underflow.

In one embodiment of the invention, if the occupancy level of the queue 102 is too high, (e.g., above an upper threshold), the controller 110 speeds up the clock 122 so that the rate at which audio data is removed from the queue 102 and decoded is increased. If the occupancy level of the queue is too low (e.g., below a lower threshold), the controller 110 slows down the clock 122 so that the rate at which audio data is removed from the queue 102 and decoded by the audio decoder 120 is decreased.

In an alternative embodiment an audio decoder queue overflow or underflow is prevented by adding or removing data from the audio decoder queue 102.

Figure 5:
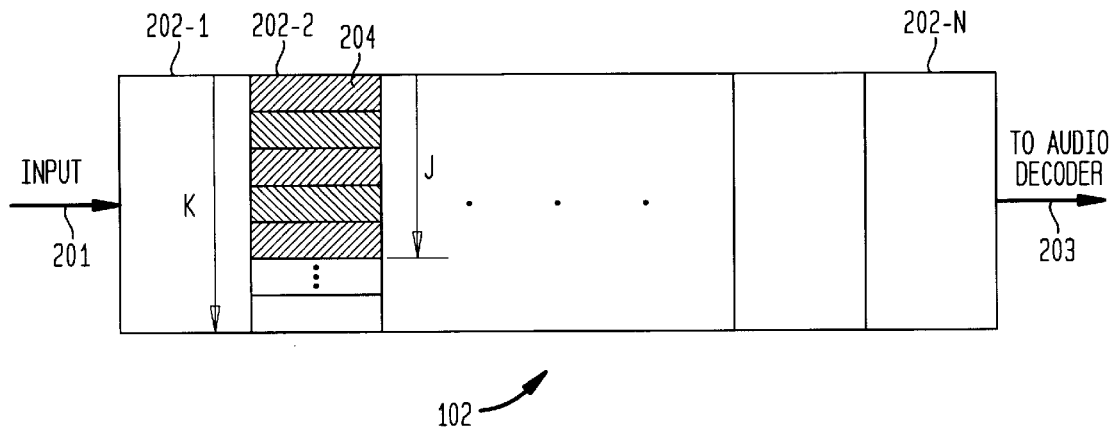
FIG. 5 illustrates the structure of an audio decoder queue for use in the display interface of FIG. 4.

The structure of the audio queue 102 is shown in greater detail in FIG. 5.

The audio queue 102 is a FIFO queue. Audio data enters the queue at the input 201 and leaves the queue 102 to be decoded at the output 203. The queue 102 comprises a plurality of buffer units 202-1, 202-2, . . . , 202-N. The audio data is shifted from one buffer unit to the next starting at buffer unit 202-1 and ending at buffer unit 202-N. Each buffer unit 202 is K bytes wide. Each byte-sized storage unit is designated 204. In general, J of K (J≦K) storage units 204, in each buffer unit 202 are filled with data and the remainder are empty.

There are a number of techniques which may be utilized by the controller 110 to add or delete data from the queue 102. One addition technique is to increase J by duplicating the last byte in at least a subset of the buffer units 202. Preferably, the buffer units 202 for which the last byte is duplicated are located near the back of the FIFO queue 102. The preferred deletion technique is to remove a byte such as the last byte from one or more buffer units 202 which advantageously may be located near the back of the FIFO queue 102. This process of gradually adding or deleting data from the queue 102 is known as trimming.

Alternatively, the audio queue 102 may be reset to an initial occupancy level by adding or deleting data from the front or back of the FIFO. Data may be added by stuffing bits to fill up one or more buffer units 202. Data may be deleted by erasing the data in one or more buffer units 202. Preferably data is added or deleted from the back but may be added or deleted from the front of the audio FIFO queue 102. The problem with these techniques is that they may result in an audio glitch when the audio is played because stuffing bits have been added to the audio stream or data is removed from the audio stream.

In yet another alternative, if there is a danger of an underflow, it is possible to stop emptying the queue into the audio decoder until the audio buffer fills up. A problem with this technique is that there is an audio glitch which may be audible by the user as a result of the small time period during which no audio data is being decoded.

To determine whether the occupancy of the audio receiving queue is above an upper threshold or below a lower threshold a time average of the audio receiving queue occupancy is preferably used. To determine this time average, the queue occupancy is periodically measured, and each measured occupancy is stored in a history buffer. A low pass digital filtering algorithm can be used on the queue occupancy history buffer to detect if the queue is slowly increasing or decreasing in occupancy. The low pass filtering can be implemented by using moving average algorithm on the audio receiving queue occupancy history. If the output signal of the low pass filtering of the audio receiving queue occupancy history goes above or below predetermined thresholds, then one of the steps (1), (2), or (3) may be taken.

It is also desirable to synchronize the audio and video data streams received at a receiving station in the live multicast.

Figure 6:
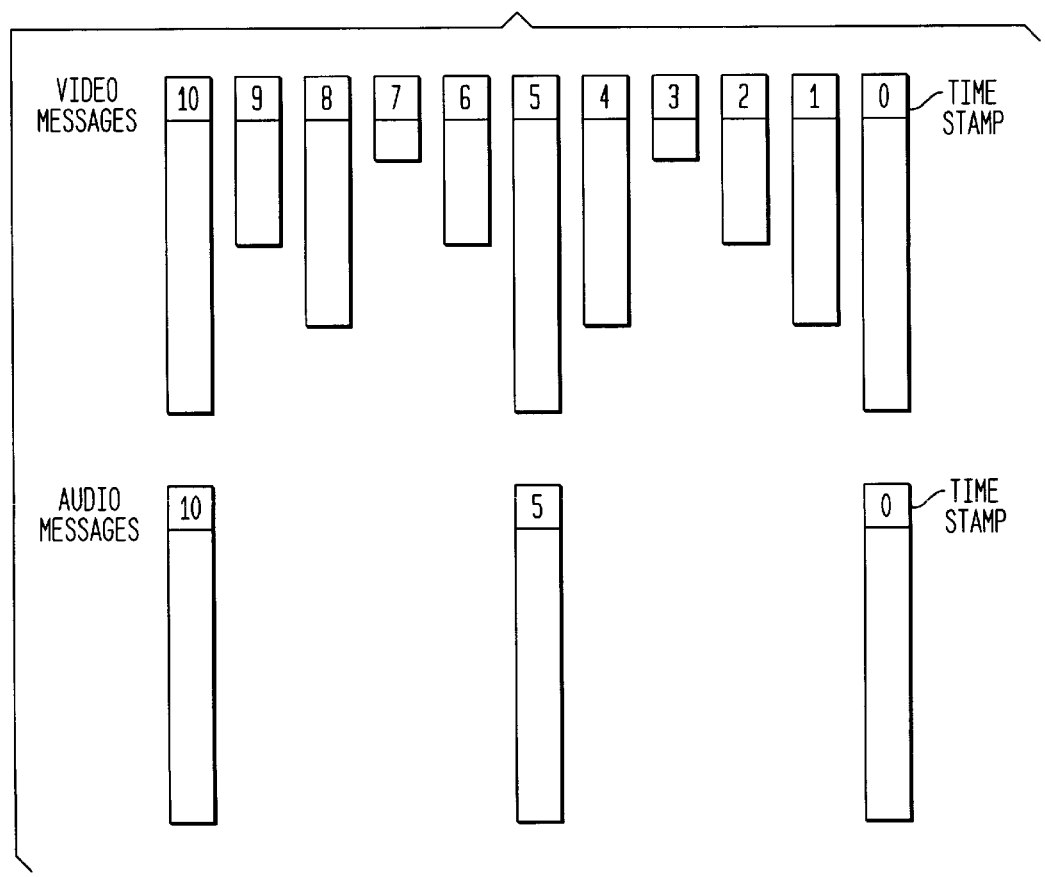
FIG. 6 illustrates the placing of time stamps in audio messages and video messages, the messages containing audio and video data from a live multicast.

FIG. 6 shows the format of the video messages and audio messages generated by the source station.

The video messages are of variable size and each video message contains the compressed data of one video frame. Each video message has a time stamp. In FIG. 6, eleven video messages are shown having the time stamps zero through ten.

The audio messages are of fixed size. The play time of each audio message depends on the size of the audio message. Thus, the audio messages have a fixed play time. The size of each audio message is large enough to achieve transmission efficiency, but small enough so that there is not a noticeable deterioration of playback quality when a message is lost.

Each audio message contains audio data associated with a fixed number of video frames. For example, in FIG. 6, each message contains audio data associated with five video frames. Put another way, the video data, when decoded, has a display rate of thirty frames per second. Thus, each audio message contains audio data corresponding to a fixed number (e.g. five) frame display periods.

The audio messages each have a time stamp corresponding to the first video message (or frame) with which the audio message is associated.

Thus in FIG. 6, the first audio message with time stamp 0 corresponds to the first five video messages with time stamps 0 to 4.

Similarly, the second audio message with time stamp 5 corresponds to the video message with time stamps 5 through 9.

As indicated above, the video messages and audio messages are transmitted in separate streams through the network to each receiving station in the multicast. At each receiving station, the audio messages are placed in the audio FIFO queue 102 and the video messages are placed in the video FIFO queue 104 (see FIG. 4).

The audio messages are each divided into fixed sized chunks. Each individual audio chunk has a play time equal to the display time of a single video frame. These individual audio chunks are sent from the audio queue 102 to the audio decoder 120 to be decoded and played.

The video data from the video messages is sent from the video queue 104 to the video decoder 130 to be decoded and displayed. It is desirable to insure that each audio chunk is played at the same time that the corresponding video frame is displayed.

For each audio chunk that is transferred from the audio queue to the decoder, it is possible to determine an audio chunk time stamp. The audio chunk time stamp is determined from the time stamp of the last audio message pushed into the audio queue 102 and the number of chunks that are present in the audio queue 102.

The controller 110 determines the audio chunk time stamp T* by detecting the occupancy of the audio queue 102 and the time stamp of the last audio message pushed into the audio queue 102. The controller 110 then evaluates T* according to $$T^* = TA - B$$

where

TA is the time stamp of the last audio message to enter the audio queue 102, and B is the number of chunks in the audio queue 102.

Then, the controller 110 compares T* with T, where T is the time stamp of the actual next video frame at the front of the video FIFO queue 104.

If T*>T (i.e., the audio is ahead of the video), then the frame at the head of the video buffer 104 is discarded by the controller 110 until T*=T. The frame for which T*=T is the next video frame which is decoded and displayed.

If T*<T (i.e., the video is ahead of the audio), then the video frame at the head of the video buffer 104 is delayed by the controller 110 until T*=T.

In other words, T* is an indication of the next audio chunk to be played. The quantity |T*−T| indicates a departure from synchronization of the audio and video data streams. The controller 110 delays video frames or drops video frames to achieve synchronization between the audio and video data streams.

In an alternative embodiment of the invention, the audio message may contain pointers indicating the location of the audio chunk boundaries. This is especially useful if the audio message contains audio chunks of variable size. Such pointers may also include audio chunk time stamps so that it will not be necessary to calculate such time stamps.

In short, there has been disclosed a method for use at a receiving station in a LAN which is participating in a live multicast for synchronizing the receiving station's audio decoder with the source station. In addition, a method has been disclosed for synchronizing the audio and video streams received at the receiving station.

Finally, the above-described embodiments of the invention are intended to be illustrative only. Numerous alternative embodiments may be devised by those skilled in the art without departing from the scope of the following claims.

What is claimed is:

1. A method for synchronizing audio and video data streams of a live multicast transmitted from a source station to a plurality of receiving stations in a LAN, said method comprising the steps of:

1) receiving in a video FIFO queue at each receiving station a sequence of video messages, said video messages being of variable size and each video message containing coded data for one video frame, each received video frame having a time stamp associated therewith, said time stamp being embedded in said video data stream, 2) receiving in an audio FIFO queue at each receiving station a sequence of fixed sized audio messages, each audio message containing one or more chunks, each chunk containing audio data corresponding to one video frame, each audio message including a time stamp embedded in said audio data stream which is used to determine a time stamp for each said chunk in said audio message, wherein said time stamp in said audio message is the same as the time stamp of one of said video frames of said fixed number of video frames presented simultaneously as audio reproduced from said audio message.

3) transferring said audio chunks from said audio queue to an audio decoder, 4) transferring video data for each frame from said video queue to a video decoder, 5) comparing said time stamp for said next chunk with said time stamp associated with a next video frame in said video queue to be decoded, 6) if said comparison indicates that said next chunk is too early for said next video frame, delaying said next video frame, and 7) if said comparison indicates that said next chunk is too late for said next video frame, discarding said next video frame.

2. The method of claim 1, wherein each of said chunks is a fixed size and the time stamp of each chunk is determined from the number of chunks in the audio queue.

3. A method for transmitting audio and video data streams of a live multicast from a source station to a plurality of receiving stations in a LAN, said method comprising the steps of:

1) generating at said source station a sequence of video messages, each video message containing data of one compressed video frame, said video messages being of variable size and each video message having a time stamp, said time stamp being embedded in said video data stream, 2) generating at said source station a sequence of audio messages, each audio message being of fixed size and containing audio data corresponding to a fixed number of video frames, each audio message having a time stamp embedded in said audio data stream which is the same as the time stamp of one of said video frames to which the audio message corresponds, and 3) transmitting said audio and video messages via said LAN to said receiving stations.

4. A method for receiving audio and video data streams of a live multicast in a receiving station in a LAN comprising the steps of:

1) receiving in an audio queue at said receiving station a sequence of audio messages, each audio message containing one or more chunks, each chunk containing audio data corresponding to one video frame, each audio message including a time stamp embedded in said audio data stream which is used to determine a time stamp for each said chunk in said audio message, 2) synchronizing an audio decode clock at said receiving station with a source station of said multicast by detecting an occupancy of said audio queue which is above an upper threshold or below a lower threshold, 3) receiving in a video queue at the receiving station a sequence of video messages, said video messages being of variable size and each video message containing coded data for one video frame, each received video frame having a time stamp, said time stamp being embedded in said video data stream, 4) transferring said audio chunks from said audio queue to an audio decoder, 5) transferring video data for each frame from said video queue to a video decoder, 6) comparing said time stamp for said next chunk with said time stamp associated with a next video frame in said video queue to be decoded, 7) if said comparison indicates that said next chunk is too early for said next video frame, delaying said next video frame, and 8) if said comparison indicates that said next chunk is too late for said next video frame, discarding said next video frame.

* * * * *